US012623643B2

(12) United States Patent
Watanabe

(10) Patent No.: US 12,623,643 B2
(45) Date of Patent: May 12, 2026

(54) BRAKE CONTROL DEVICE AND BRAKE CONTROL METHOD

(71) Applicant: TOYOTA JIDOSHA KABUSHIKI KAISHA, Toyota (JP)

(72) Inventor: Ryochi Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/809,506

(22) Filed: Aug. 20, 2024

(65) Prior Publication Data

US 2025/0162552 A1    May 22, 2025

(30) Foreign Application Priority Data

Nov. 22, 2023    (JP) ................................. 2023-198390

(51) Int. Cl.
B60T 8/32 (2006.01)
B60T 8/171 (2006.01)

(52) U.S. Cl.
CPC ............. B60T 8/3275 (2013.01); B60T 8/171 (2013.01); B60T 2210/32 (2013.01); B60T 2220/04 (2013.01); B60T 2230/04 (2013.01)

(58) Field of Classification Search
CPC ......... B60T 8/171; B60T 8/3255–3275; B60T 2210/32; B60T 2220/04; B60T 2230/04
See application file for complete search history.

(56) References Cited

U.S. PATENT DOCUMENTS 12,054,133 B2 * 8/2024 Yamamoto ............ B60T 13/146
2023/0063777 A1   3/2023 Yamamoto

FOREIGN PATENT DOCUMENTS

JP        10297461 A  * 11/1998
JP      2003-182544 A    7/2003
JP      2005-112243 A    4/2005
JP      2007022376 A  *  2/2007
JP      2021-112950 A    8/2021

OTHER PUBLICATIONS

Takenaka, JP H10-297461, machine translation. (Year: 1998).*
Tawara, JP 2007-022376, machine translation. (Year: 2007).*

* cited by examiner

*Primary Examiner* — Mark L. Greene
(74) *Attorney, Agent, or Firm* — SoraIP, Inc.

(57) ABSTRACT

A brake control device includes a deciding unit for deciding a requested deceleration that is requested by the driver, based on the brake pedal operation amount that is acquired, and a braking processing unit for deciding a braking amount of braking to be executed by a brake device, based on the requested deceleration that is decided, and deciding to execute reducing control in which a deceleration is reduced as compared to the requested deceleration immediately before stopping a vehicle. The braking processing unit is configured to execute increasing control in which a deceleration is increased as compared to the requested deceleration before executing the reducing control, and decides whether to execute the increasing control based on the detection result of the in-vehicle sensor.

2 Claims, 5 Drawing Sheets

GRAPH (a)

GRAPH (b)

20

BRAKE CONTROL DEVICE AND BRAKE CONTROL METHOD

CROSS-REFERENCE TO RELATED APPLICATION

This application claims priority to Japanese Patent Application No. 2023-198390 filed on Nov. 22, 2023, incorporated herein by reference in its entirety.

BACKGROUND

1. Technical Field

The disclosure relates to brake control for slowing change in deceleration immediately before a vehicle stops.

2. Description of Related Art

In order to suppress pitching behavior of a vehicle generated when applying a braking force to the vehicle when stopping the vehicle in a state of applying the braking force to the vehicle, Japanese Unexamined Patent Application Publication No. 2021-112950 (JP 2021-112950 A) discloses a control device for executing reducing control for reducing the braking force in accordance with a braking request before the vehicle stops, and also for executing increasing control for increasing the braking force in accordance with the braking request before the reducing control.

SUMMARY

In technology disclosed in JP 2021-112950 A, the increasing control and the reducing control are executed immediately before the vehicle stops, and accordingly there is concern that increase in amount of change in the deceleration may cause the braking feeling to be perceived as being unnatural.

An object of the disclosure is to provide technology for improving braking feeling while suppressing swinging in a pitching direction from occurring when the vehicle is stopped.

In order to solve the above problem, a brake control device according to an aspect of the disclosure includes an acquisition unit that acquires a brake pedal operation amount of a brake pedal operation performed by a driver, and a detection result of an in-vehicle sensor, a deciding unit for deciding a requested deceleration that is requested by the driver, based on the brake pedal operation amount that is acquired, and a braking processing unit for deciding a braking amount of braking to be executed by a brake device, based on the requested deceleration that is decided, and deciding to execute reducing control in which a deceleration is reduced as compared to the requested deceleration immediately before stopping a vehicle.

The braking processing unit is configured to execute increasing control in which the deceleration is increased as compared to the requested deceleration before executing the reducing control, and decides whether to execute the increasing control based on the detection result of the in-vehicle sensor.

Another aspect of the disclosure is a brake control method, of which each step is executed by a brake control device of a vehicle.

The method includes acquiring a brake pedal operation amount of a brake pedal operation performed by a driver, and a detection result of an in-vehicle sensor, deciding a requested deceleration that is requested by the driver, based on the brake pedal operation amount that is acquired, starting to control a braking amount to be executed by a brake device, based on the requested deceleration that is decided, deciding whether to execute increasing control in which a deceleration is increased as compared to the requested deceleration before stopping the vehicle, based on the detection result of the in-vehicle sensor, executing the increasing control when deciding to execute the increasing control, and executing reducing control in which the deceleration is reduced as compared to the requested deceleration when stopping the vehicle.

According to the disclosure, technology can be provided that improves braking feeling while suppressing swinging from occurring in the pitching direction when the vehicle is being stopped.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
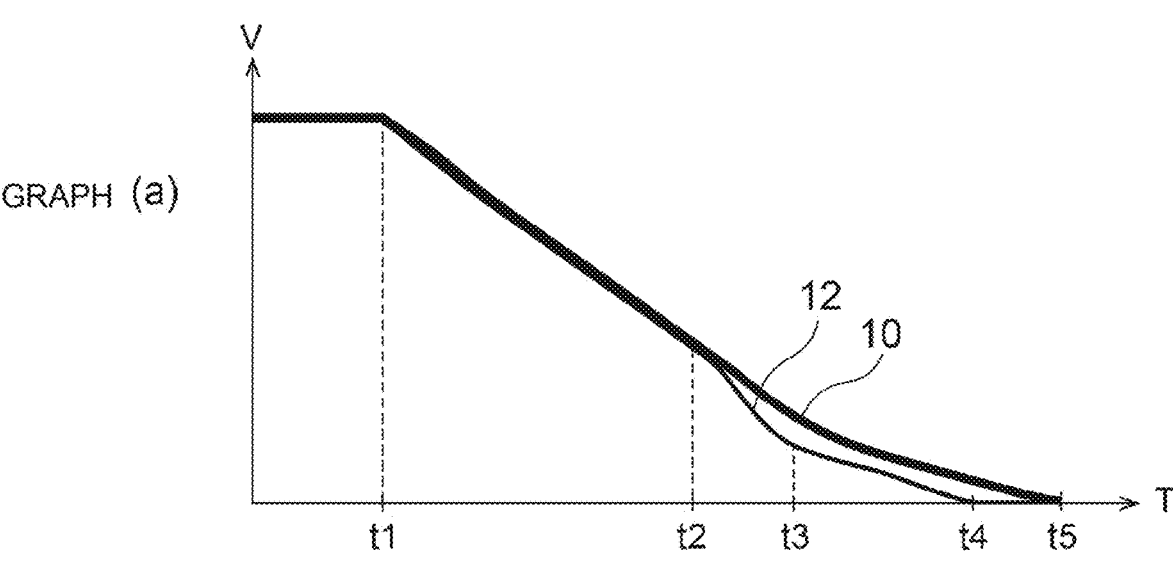
FIG. 1 is a diagram for explaining an operation of a brake control system according to a first embodiment.
Figure 1:
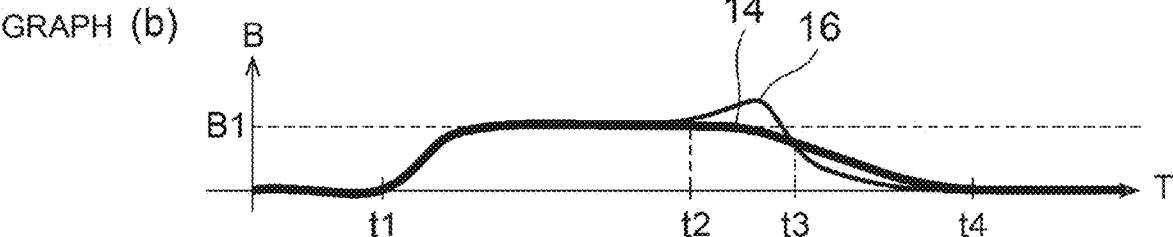

FIG. 1 is a diagram for explaining an operation of a brake control system according to a first embodiment. The graph (a) of FIG. 1 shows the relationship between the vehicle speed V and the time T in the brake control, and the graph (b) of FIG. 1 shows the relationship between the deceleration B and the time T in the brake control. The time T shown in the graph (a) and the graph (b) indicates the passage of the same time.

The first vehicle speed 10 and the first deceleration 14 indicate control results executed by the brake control system of the embodiment, and the second vehicle speed 12 and the second deceleration 16 indicate control results executed by the brake control system of the comparative technology. The comparative technique is a technique to be compared with the brake control system of the first embodiment.

The change in the second vehicle speed 12 and the second deceleration 16 of the comparative technology will be described. At the time t1, braking is started, the second deceleration 16 starts to increase, and the second vehicle speed 12 starts to decrease. At the time t2, the control for increasing the second deceleration 16 is started, and the second deceleration 16 is increased more than the requested deceleration B1 of the driver in the time t2, and the second vehicle speed 12 is rapidly decreasing. At the time t3, the control to increase the second deceleration 16 ends, and the second deceleration 16 starts to be reduced more than the driver's requested deceleration at the time t3. At time t4, the second vehicle speed 12 is zeroed and the vehicle is stopped.

In the comparative technique, since the second deceleration 16 is reduced from the time t3 immediately before the vehicle is stopped to the time t4 than the driver's requested deceleration, it is possible to prevent the vehicle from swinging in the pitch-direction when the vehicle is stopped. Further, since the second deceleration 16 is increased more than the driver's requested deceleration from the time t2 to the time t3, the reduced second deceleration 16 immediately before the vehicle is stopped can be compensated and finally adjusted to the driver's requested deceleration. The increasing control the deceleration from the time t2 to the time t3 than the requested deceleration of the driver is referred to as an increase control. The control of reducing the deceleration from the time t3 to the time t4 than the driver's requested deceleration is referred to as reducing control.

Since the second deceleration 16 of the comparative technique has a large change before the vehicle stops, there is a possibility that the driver feels a large change in acceleration and feels uncomfortable in feeling.

In the braking control system of the first embodiment, at the time t1, braking is started, the first deceleration 14 starts to increase, and the first vehicle speed 10 starts to decrease. At the time t2, the first deceleration 14 starts to be decreased in response to the driver's manipulation. At time t3, the first deceleration 14 begins to be reduced relative to the driver's requested deceleration at time t3. The vehicle does not stop at the time t4, and the first vehicle speed 10 becomes zero at the time t5, and the vehicle stops.

The first vehicle speed 10 corresponding to the first embodiment has a slower stopping timing of the vehicle than the second vehicle speed 12 corresponding to the comparative technology, but the speed change is smoother than the second vehicle speed 12. Thus, in the brake control system of the embodiment, it is possible to suppress the occurrence of the swing in the pitch direction at the time of stopping the vehicle while suppressing the acceleration change that occurs at the time of stopping the vehicle as compared with the comparative technique.

Figure 2:
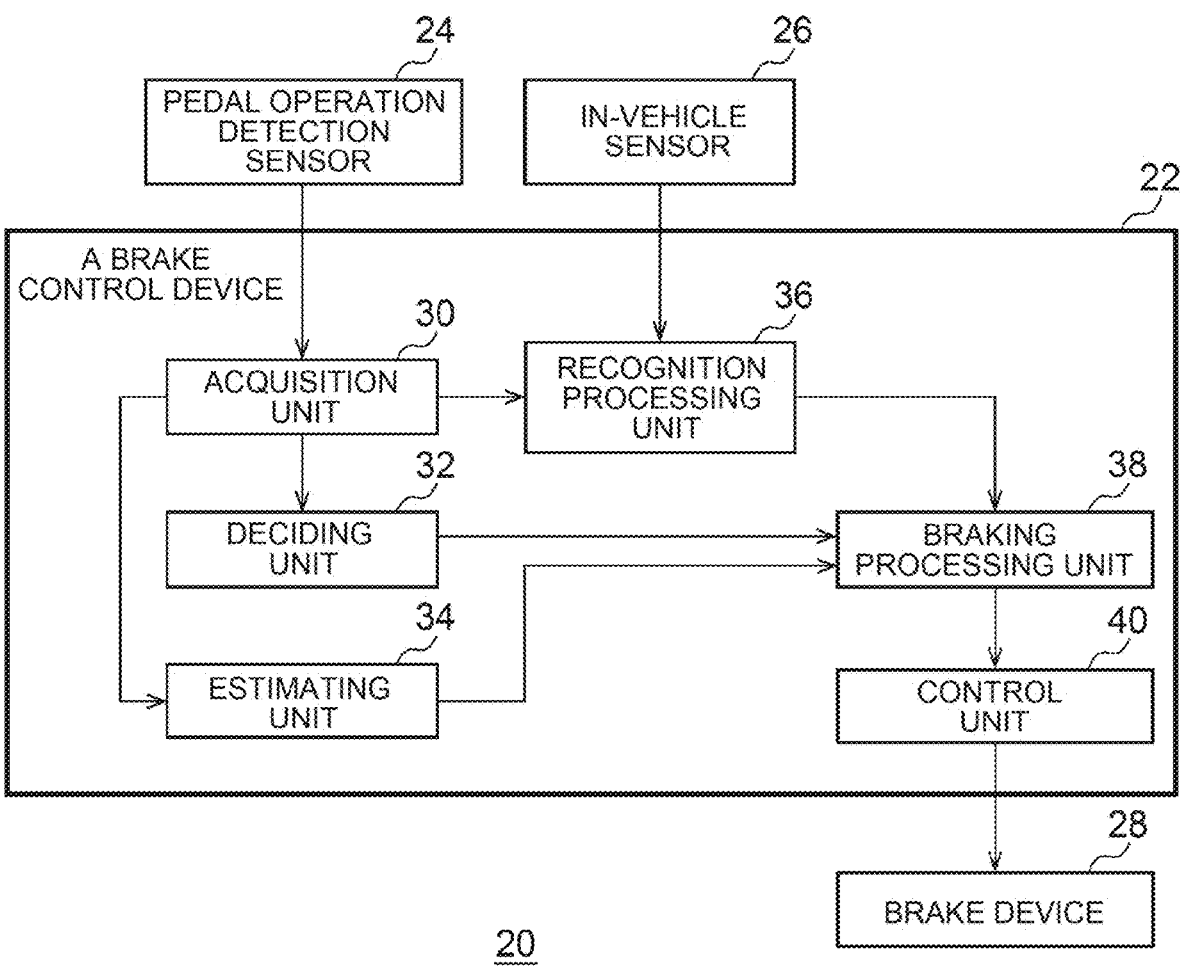
FIG. 2 is a diagram illustrating a functional configuration of a brake control system.

FIG. 2 is a diagram illustrating a functional configuration of the brake control system 20. The respective functions of the brake control system 20 may be configured by an LSI such as a circuit-block, a memory, or the like in hardware. Software is realized by system software, application programs, or the like loaded in a memory. Accordingly, those skilled in the art will appreciate that the various functions of the brake control system 20 can be implemented in various forms by only hardware, only software, or a combination thereof, and are not limited thereto. The brake control system 20 may be provided in a vehicle, and the vehicle may be capable of autonomous driving.

The brake control system 20 includes a brake control device 22, a pedal operation detection sensor 24, an in-vehicle sensor 26, and a brake device 28.

The pedal operation detection sensor 24 detects a brake pedal operation amount, that is, a deceleration requested by the driver, and transmits a detection result to the brake control device 22. The pedal operation detection sensor 24 is, for example, a stroke sensor that detects the depression amount of the brake pedal, and may be a sensor that detects the master cylinder pressure.

The in-vehicle sensor 26 includes a plurality of sensors mounted on the vehicle, and includes a traveling state detection sensor that detects a traveling state of the vehicle, and an object detection sensor that detects an object located around the vehicle. The travel state detection sensor includes a vehicle speed sensor, an acceleration sensor, a position information detection sensor, a brake output detection sensor, and the like. The vehicle speed sensor detects a traveling speed of the vehicle, and may be, for example, a wheel speed sensor. The acceleration sensor detects an acceleration of the vehicle. The position information detecting sensor uses a global navigation satellite system (GNSS) to acquire position information of vehicles. The brake output detection sensor detects an output of the brake device 28.

The object detection sensor includes an in-vehicle camera, a millimeter wave radar, an ultrasonic sensor, a light detection and ranging sensor. The in-vehicle camera captures an image of the surroundings of the vehicle to generate a captured image. The millimeter wave radar, the ultrasonic sensor, and the light detection and ranging sensor detect a distance and a direction of an object.

The object detection sensor detects an object for stopping among the objects. The object for stopping includes an object that is an obstacle to the traveling of the vehicle, and an indication indicating the stop of the vehicle, and is, for example, a road installation such as another vehicle, a pedestrian, a crosswalk, a stop line, or the like.

The brake device 28 is a hydraulic brake device that applies a frictional force to the wheels, and is driven under the control of the brake control device 22 to apply a braking force to the vehicle.

The brake control device 22 includes an acquisition unit 30, a deciding unit 32, an estimating unit 34, a recognition processing unit 36, a braking processing unit 38, and a control unit 40. The acquisition unit 30 acquires the brake pedal operation amount of the driver detected by the pedal operation detection sensor 24 and the detection result from the in-vehicle sensor 26.

The deciding unit 32 determines the deceleration exerted by the brake device 28 based on the detection result of the pedal operation detection sensor 24. The deciding unit 32 determines the requested deceleration of the driver based on the operation amount of the brake pedal.

The recognition processing unit 36 executes a process of recognizing an object on the basis of a detection result of the object detection sensor, and generates information on the object. The recognition processing unit 36 analyzes the captured image and outputs the type of the object and its position information. The recognition processing unit 36 may use a neural network method in image analysis, and may extract an object using a machine learning method. The recognition processing unit 36 generates information on the object for object for stopping located in the traveling direction of the vehicle, and sends the information to the braking processing unit 38. The information relating to the object for stopping located in the traveling direction of the vehicle may be the position information of the object for stopping, and may be a flag indicating that the stop is to be performed.

The braking processing unit 38 instructs the control unit 40 to perform braking in accordance with the requested deceleration of the driver if the reducing control and the increasing control are not executed. The braking processing unit 38 determines a timing at which the deceleration reducing control executed immediately before the vehicle stops and the deceleration increasing control executed before the deceleration reducing control are executed. It is determined that the vehicle is stopped based on the requested deceleration of the driver and an object existing in the vicinity of the vehicle. The braking processing unit 38 determines whether to execute the increasing control based on the detection result of the in-vehicle sensor 26.

The reducing control is a control for reducing the deceleration more than the driver's requested deceleration immediately before the vehicle stops. The braking processing unit 38 sets a decreasing start timing for starting the reducing control based on the requested deceleration and the vehicle speed, and determines to execute the reducing control until the vehicle stops. When the driver's requested deceleration increases, the reducing control ends before the vehicle stops. The braking processing unit 38 decreases the driver's requested deceleration in accordance with a preset deceleration decreasing gradient. The start timing of the reducing control may be set at the vehicle speed, and the braking processing unit 38 may set the reduction start vehicle speed.

the increasing control is a control that compensates for the deceleration decreased by the reducing control. The braking processing unit 38 sets the increase amount of the deceleration in the increasing control based on the difference between the integrated value of the deceleration to be decreased by the reducing control and the integrated value of the deceleration in the case where the reducing control is not executed. The integrated value of the deceleration reduced by the reducing control may be converted into the travel distance. The braking processing unit 38 may estimate the first braking distance when the reducing control is executed and the second braking distance when the reducing control is not executed, and may set the increase amount of the deceleration in the increasing control in accordance with the difference between the first braking distance and the second braking distance. The braking processing unit 38 sets the increase start vehicle speed corresponding to the increase start timing based on the current deceleration and the vehicle speed.

The braking processing unit 38 determines to execute the increasing control when it is detected that the object for stopping is present in the traveling direction of the vehicle, and determines not to execute the increasing control when it is not detected that the object for stopping is present in the traveling direction of the vehicle. Thus, if the object for stopping is in the traveling direction of the vehicle, it is possible to compensate for the deceleration which decreases by the reducing control by executing the increasing control. Further, if the object for stopping is not in the traveling direction of the vehicle, the increasing control is not executed, the reducing control is executed, and although the braking distance of the vehicle is extended, the swing in the pitch direction is suppressed.

The control unit 40 controls a braking amount to be executed by the brake device 28 based on the determined requested deceleration. In response to the determination by the braking processing unit 38, the control unit 40 executes reducing control for reducing the deceleration more than the requested deceleration immediately before stopping the vehicle. As a result, it is possible to suppress swinging in the pitch direction that occurs when the vehicle is stopped.

The control unit 40 can execute an increase control that increases the deceleration more than the requested deceleration before executing the reducing control, and executes the increasing control in accordance with the determination of the braking processing unit 38.

Figure 3:
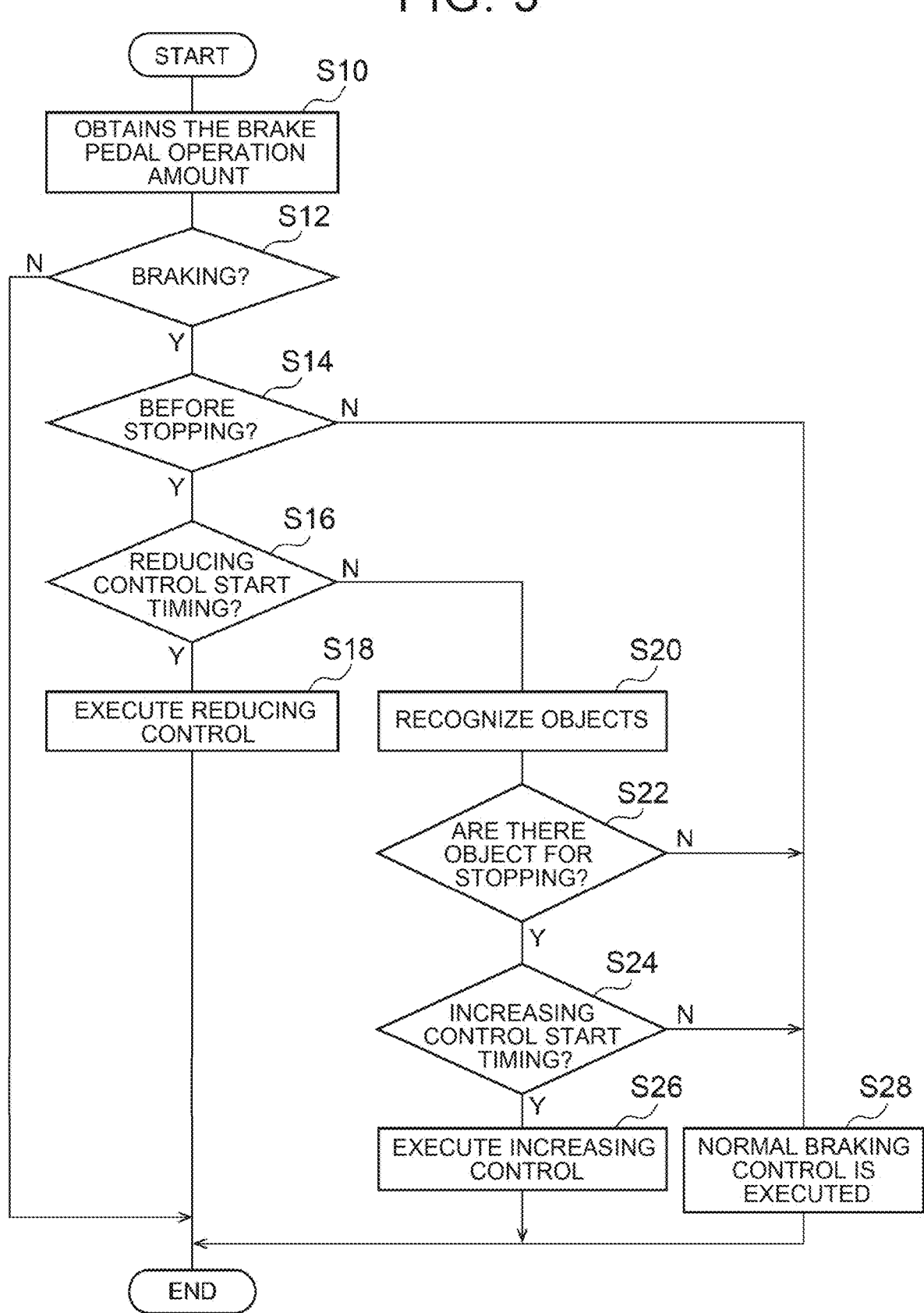
FIG. 3 is a flowchart of the brake control method according to the first embodiment.

FIG. 3 is a flowchart of the brake control method according to the first embodiment. This process is executed periodically. The acquisition unit 30 acquires the brake pedal operation amount from the pedal operation detection sensor 24 (S10), and the deciding unit 32 calculates the requested deceleration of the driver from the brake pedal operation amount. The braking processing unit 38 determines whether the vehicle is braking, that is, whether the requested deceleration is greater than zero (S12).

If the vehicle is not braking (N in S12), the process ends. If the vehicle is braking (Y in S12), the braking processing unit 38 determines whether the vehicle is not stopped, that is, whether the vehicle is traveling (S14). When the vehicle is stopped (N in S14), the normal braking control is executed in accordance with the requested deceleration without executing the increasing control and the reducing control (S28).

If the vehicle is not stopped (Y in S14), the braking processing unit 38 determines whether or not the reducing control is started (S16). Whether or not the start timing of the reducing control is the start timing is determined by the fact that the vehicle speed has decreased to the reduction start vehicle speed set by the braking processing unit 38.

If it is the start timing of the reducing control (S16 Y), the braking processing unit 38 determines the start of the reducing control, the control unit 40 executes the reducing control (S18), and ends the present processing. If it is not the starting timing of the reducing control (N in S16), the braking processing unit 38 acquires the recognition result of the object from the recognition processing unit 36 (S20), and determines whether or not the presence of the object for stopping is detected in the traveling direction of the vehicle (S22).

When it is detected that an object for stopping is present in the traveling direction of the vehicle (Y in S22), the braking processing unit 38 determines whether or not the increasing control is started (S24). The start timing of the increasing control is determined by the fact that the vehicle speed becomes equal to or lower than the increase start vehicle speed.

If it is determined that the increasing control starts (Y in S24), the braking processing unit 38 determines to start the increasing control, and the control unit 40 executes the increasing control (S26). If it is determined that it is not the starting timing of the increasing control (N in S24), the control unit 40 controls the brake device 28 with the braking amount corresponding to the requested deceleration of the driver, executes the normal braking control (S28), and the process ends. When it is not detected that the object for stopping is present in the traveling direction of the vehicle (N in S22), the braking processing unit 38 determines to execute the normal braking control (S28).

Second Embodiment

Figure 4:
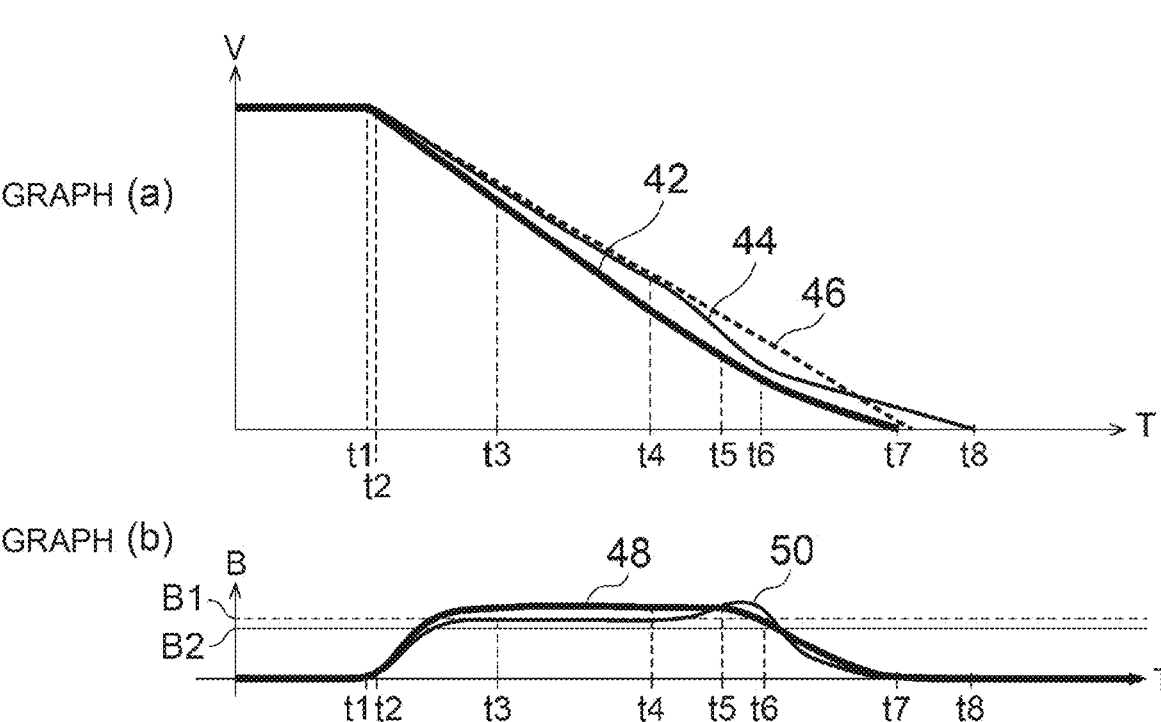
FIG. 4 is a view for explaining the operation of the braking control device according to the second embodiment.

FIG. 4 is a diagram for explaining an operation of the brake control system 20 according to the second embodiment. The graph (a) of FIG. 4 shows the relationship between the vehicle speed V and the time T in the brake control, and the graph (b) of FIG. 4 shows the relationship between the deceleration B and the time T in the brake control. The time T shown in the graph (a) and the graph (b) indicates the passage of the same time. A second embodiment will be described with reference to FIG. 2.

In the brake control system 20 of the second embodiment, the braking processing unit 38 decides to execute the reducing control that reduces the deceleration more than the driver's requested deceleration immediately before stopping the vehicle. The braking processing unit 38 is capable of executing an increase control that increases the deceleration more than the driver's requested deceleration before executing the reducing control. Then, the braking processing unit 38 determines whether to execute the increasing control or based on the detection result of the in-vehicle sensor 26.

The first vehicle speed 42 and the first deceleration 48 indicate control results executed by the brake control system 20 of the second embodiment, and the second vehicle speed 44 and the second deceleration 50 indicate control results executed by the brake control system of the comparative technology. The comparative technique is a technique to be compared with the brake control system of the second embodiment, and is the same as the comparative technique shown in FIG. 1.

The change in the second vehicle speed 44 and the second deceleration 50 of the comparative technology will be described. At the time t1 shown in FIG. 4, braking is started, the second deceleration 50 starts to increase, and the second vehicle speed 44 starts to decrease. At the time t4, the control for increasing the second deceleration 50 is started, and the second deceleration 50 is increased more than the requested deceleration of the driver in the time t4, so that the second vehicle speed 44 is rapidly decreasing. Thereafter, the control to increase the second deceleration 50 is ended, and the second deceleration 50 starts to decrease more than the driver's requested deceleration. At time t8, the second vehicle speed 44 is zeroed and the vehicle is stopped. The second vehicle speed 44 of the comparative technique moves up and down with respect to the reference line 46 of the straight line.

In the brake control system 20 of the second embodiment, at the time t1, braking is started, the first deceleration 48 starts to increase, and the first vehicle speed 42 starts to decrease. the increasing control is started at the time t2. In the increasing control executed in the time t3, the deceleration is higher than the estimated requested deceleration B1. An actual requested deceleration B2 by the driver is slightly deviated from the estimated requested deceleration B1. The estimated requested deceleration B1 is calculated by the brake pedal operation amount and the ascending speed of the brake pedal operation amount in the time t2. At time t5, the first deceleration 48 starts decreasing, and when the first vehicle speed 42 reaches the decreasing starting vehicle speed at time t6, the reducing control is started. The first vehicle speed 42 changes more slowly than the second vehicle speed 44 of the comparative technology. Further, since the estimated requested deceleration B1 is larger than the actual requested deceleration B2, the first vehicle speed 42 becomes zero at the time t7, and the stopping timing of the vehicle is earlier than the time t8 at which the second vehicle speed 44 of the comparative technique becomes zero.

Return to FIG. 2. The estimating unit 34 estimates an estimated requested deceleration which is a deceleration required after the initial depression based on the initial brake pedal operation amount of the depression in which the driver has started depressing the brake pedal. The initial stage of depression refers to, for example, a period from the time t1 to the time t2 illustrated in the graph (b) of FIG. 4, and may be about one second from the beginning of the manipulation. The estimated requested deceleration may be estimated by the brake pedal operation amount at the initial stage of depression and the ascending speed of the brake pedal operation amount, and may be estimated with reference to a map held in advance. The driver depresses the brake pedal to maintain the depressed state at the desired stroke position. The estimated requested deceleration estimates the stroke position maintained by the driver by the brake pedal operation amount at the initial stage of depression.

The estimating unit 34 calculates an increased requested deceleration in which a predetermined amount is added to the estimated request deceleration, the increased requested deceleration is a deceleration used in the increasing control, and when a predetermined amount is added, the increased requested deceleration is larger than the driver's request deceleration. In the increasing control illustrated in the graph (b) of FIG. 4, braking is performed at an increased requested deceleration that is higher than the estimated requested deceleration B1. The estimating unit 34 may calculate the increased requested deceleration based on the brake pedal operation amount at the initial stage of depression and the increase speed of the brake pedal operation amount.

If the difference between the increased requested deceleration and the request deceleration is within the predetermined range, the braking processing unit 38 determines to execute the increasing control for controlling the brake device 28 at the increased requested deceleration. In addition, the braking processing unit 38 determines not to execute the increasing control when the difference between the increased requested deceleration and the request deceleration is outside the predetermined range. That is, if the absolute value of the difference between the increased requested deceleration and the request deceleration is equal to or less than the predetermined value, the increasing control is executed, and if the absolute value is greater than the predetermined value, the increasing control is not executed. The predetermined range is set so as to make the driver less likely to feel uncomfortable with the brake feeling due to the deviation between the requested deceleration and the increased requested deceleration of the driver, and is set by an experiment or the like.

When the difference between the increased requested deceleration and the requested deceleration is outside the predetermined range while the increasing control is being executed, the braking processing unit 38 stops the increasing control and executes the normal braking control, that is, the control according to the requested deceleration.

Since the increased requested deceleration is calculated by the brake pedal operation amount at the initial stage of depression, the increasing control is started quickly, and the braking control until the increased requested deceleration is reached can be made gentle. the increasing control is continued until the reducing control, and after the increasing control, the reducing control is executed from the decrease start timing in the same manner as in the first embodiment. By executing the increasing control, it is possible to compensate for the deceleration decreasing by the reducing control.

Figure 5:
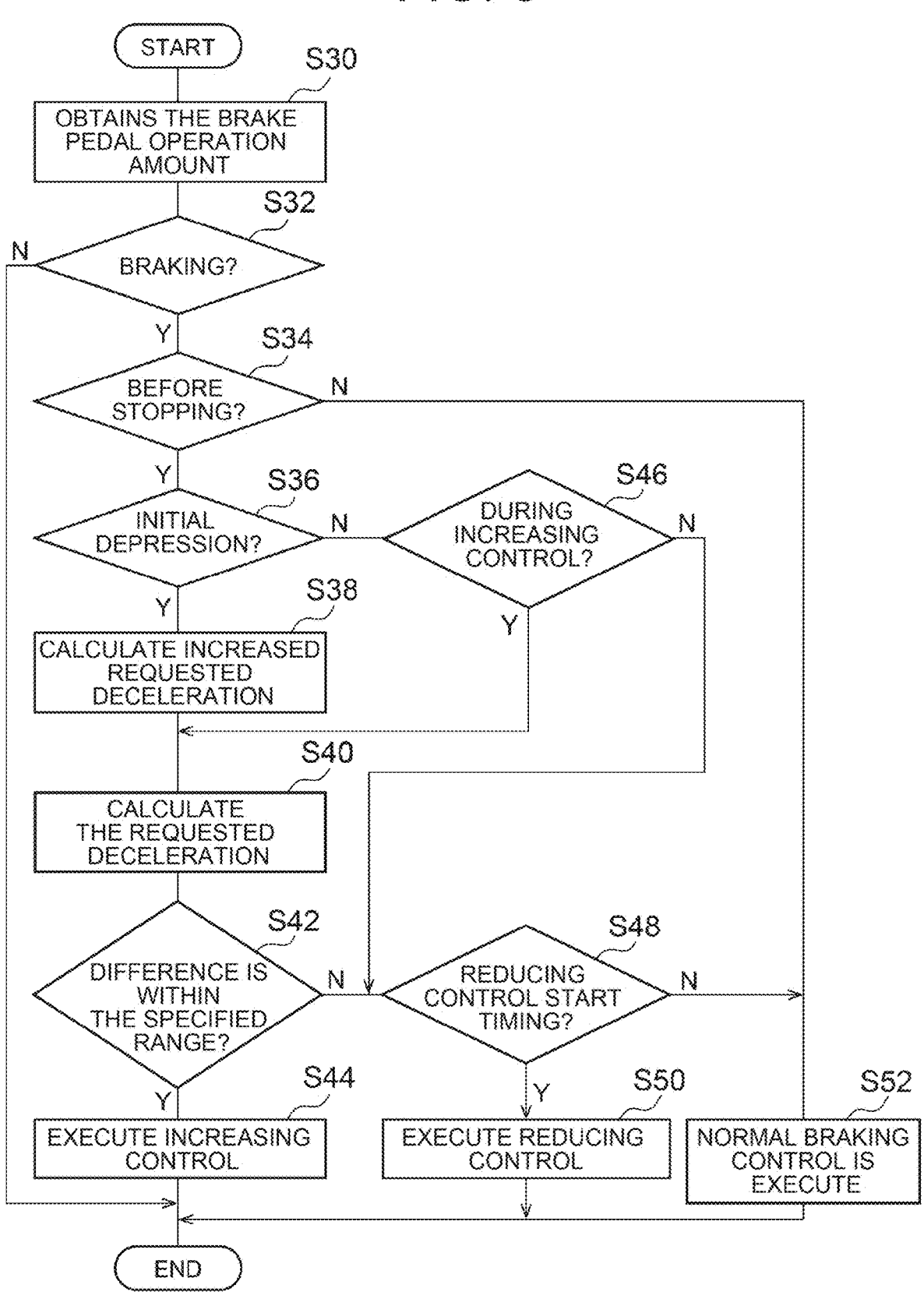
FIG. 5 is a flowchart of a brake control method according to a second embodiment.

FIG. 5 is a flowchart of a brake control method according to a second embodiment. This process is executed periodically. The acquisition unit 30 acquires the braking operation amount from the pedal operation detection sensor 24 (S30). The braking processing unit 38 determines whether or not the vehicle is braking, that is, whether or not the brake pedal operation amount is greater than zero (S32).

If the vehicle is not braking (N in S32), the process ends. If the vehicle is braking (Y in S32), the braking processing unit 38 determines whether the vehicle is not stopped, that is, whether the vehicle is traveling (S34). When the vehicle is stopped (N in S34), the normal braking control is executed in accordance with the requested deceleration without executing the increasing control and the reducing control (S52).

If the vehicle does not stop (Y in S34), the braking processing unit 38 determines whether the brake pedal is initially depressed (S36). If it is the initial stage of depression (Y in S36), the estimating unit 34 estimates the estimated requested deceleration, which is the deceleration required later from the initial stage of depression, based on the brake pedal operation amount at the initial stage of depression, and calculates the increased requested deceleration, which is the increased estimated requested deceleration (S38).

The deciding unit 32 calculates the requested deceleration of the driver on the basis of the brake pedal-operation amount (S40). The braking processing unit 38 determines whether the difference between the increased requested deceleration and the driver request deceleration is within a predetermined range (S42). If the difference between the increased requested deceleration and the driver's requested deceleration is within the predetermined range (Y in S42), the braking processing unit 38 determines to execute the increasing control, and the control unit 40 controls the braking amount according to the increased requested deceleration (S44).

If it is not at the beginning of the depression (N in S36), the braking processing unit 38 determines whether the increasing control is being performed, that is, whether the increasing control has been executed last time (S46). When the increasing control is in progress (S46 Y), the deciding unit 32 calculates the requested deceleration according to the detection result of the pedal operation detection sensor 24 (S40). The braking processing unit 38 determines whether the difference between the increased requested deceleration and the driver request deceleration is within a predetermined range (S42) by the braking processing unit 38. If the difference between the increased requested deceleration and the driver's request deceleration is within the predetermined range (Y in S42), the increasing control is continued.

If the difference between the increased requested deceleration and the driver's request deceleration is not within the predetermined range (N in S42), the braking processing unit 38 determines whether or not the reducing control starts (S48). If the increasing control is not being performed, that is, if the increasing control is not being continued (N in S46), the braking processing unit 38 determines whether or not the reducing control is started (S48). If it is the start timing of the reducing control (Y in S48), the braking processing unit 38 determines the start of the reducing control, the control unit 40 executes the reducing control (S50), and ends the present processing.

If it is not the starting timing of the reducing control (N in S48), the control unit 40 executes the normal braking control in accordance with the requested deceleration without executing the increasing control and the reducing control (S52).

The present disclosure has been described above based on examples. The present disclosure is not limited to the above-described embodiments, and various modifications such as design changes can be made based on knowledge of a person skilled in the art.

What is claimed is:

1. A brake control device comprising:
an acquisition unit that acquires a brake pedal operation amount of a brake pedal operation performed by a driver, and a detection result of an in-vehicle sensor;
a deciding unit for deciding a requested deceleration that is requested by the driver, based on the brake pedal operation amount that is acquired; and
a braking processing unit for deciding a braking amount of braking to be executed by a brake device, based on the requested deceleration that is decided, and deciding to execute reducing control in which a deceleration is reduced as compared to the requested deceleration immediately before stopping a vehicle, wherein
the braking processing unit is configured to
execute increasing control in which the deceleration is increased as compared to the requested deceleration before executing the reducing control,
decide whether to execute the increasing control based on the detection result of the in-vehicle sensor, the detection result of the in-vehicle sensor including information regarding an object for stopping, located in a traveling direction of the vehicle,
decide to execute the increasing control when detection is made that the object for stopping is present in the traveling direction of the vehicle, and
decide not to execute the increasing control when detection is not made that the object for stopping is present in the traveling direction of the vehicle.

2. A brake control device comprising:
an acquisition unit that acquires a brake pedal operation amount that is the amount of operation of a brake pedal performed by a driver, and a detection result of an in-vehicle sensor;
a deciding unit for deciding a requested deceleration that is requested by the driver, based on the brake pedal operation amount that is acquired;
a braking processing unit for deciding a braking amount of braking to be executed by a brake device, based on the requested deceleration that is decided, and deciding to execute reducing control in which a deceleration is reduced as compared to the requested deceleration immediately before stopping a vehicle; and
an estimating unit that estimates an estimated requested deceleration that is a deceleration requested later than an initial stage of depression, based on the brake pedal operation amount at an initial stage of depression in which the driver starts depressing the brake pedal, and calculates an increased requested deceleration in which the estimated requested deceleration is increased, wherein,
the braking processing unit is configured to
execute increasing control in which the deceleration is increased as compared to the requested deceleration before executing the reducing control,
decide whether to execute the increasing control based on the detection result of the in-vehicle sensor,
decide to execute the increasing control for controlling the brake device in accordance with the increased requested deceleration when a difference between the increased requested deceleration and the requested deceleration is within a predetermined range, and
decide not to execute the increasing control when the difference between the increased requested deceleration and the requested deceleration is outside of the predetermined range.

* * * * *